US012711376B2

(12) United States Patent
Takeshima

(10) Patent No.: US 12,711,376 B2
(45) Date of Patent: Aug. 18, 2026

(54) PSEUDO-DATA GENERATION APPARATUS, PSEUDO-DATA GENERATION METHOD, LEARNING APPARATUS AND LEARNING METHOD

(71) Applicant: Canon Kabushiki Kaisha, Tokyo (JP)

(72) Inventor: Hidenori Takeshima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 350 days.

(21) Appl. No.: 18/052,248

(22) Filed: Nov. 3, 2022

(65) Prior Publication Data

US 2023/0143991 A1 May 11, 2023

(30) Foreign Application Priority Data

Nov. 5, 2021 (JP) ................................ 2021-181129
Nov. 2, 2022 (JP) ................................ 2022-176429

(51) Int. Cl.
*G06K 9/00* (2022.01)
*G06N 3/08* (2023.01)

(52) U.S. Cl.
CPC ...... *G06N 3/08* (2013.01); *G06T 2207/10072* (2013.01)

(58) Field of Classification Search
CPC ...................... G06N 3/08; G06N 20/00; G06T 2207/10072; G06T 2207/10088; G06T 2207/10148; G06T 2207/20081; G06T 2207/20084; G06T 2207/30016; G06T 2207/30096; G06T 3/4053; G06T 7/50; G06T 11/00
See application file for complete search history.

(56) References Cited

U.S. PATENT DOCUMENTS 11,077,320 B1 * 8/2021 Hibbard ............... A61N 5/1031
2021/0133936 A1 * 5/2021 Chandra .................. G06T 5/50
(Continued)

FOREIGN PATENT DOCUMENTS

WO WO-2021029231 A1 * 2/2021 ........... A61B 3/0025

OTHER PUBLICATIONS

Takeshima, "Deep Learning and Its Application to Function Approximation for MR in Medicine: An Overview", Magnetic Resonance in Medical Sciences, Sep. 17, 2021, URL: https://doi.org/10.2463/mrms.rev.2021-0040, 16 pages.

(Continued)

*Primary Examiner* — Xin Jia
(74) *Attorney, Agent, or Firm* — Oblon, McClelland, Maier & Neustadt, L.L.P.

(57) ABSTRACT

According to one embodiment, a pseudo-data generation apparatus includes processing circuitry. The processing circuitry acquires one or more pieces of partial observation data that form part of whole observation data. The processing circuitry generates pseudo-whole observation data by inputting the one or more pieces of partial observation data to a function, the pseudo-whole observation data being pseudo-data of the whole observation data. The function is optimized by training so that partial observation data for training and pseudo-partial observation data for training resemble each other, the pseudo-partial observation data for training being obtained by converting the pseudo-whole observation data for training.

4 Claims, 9 Drawing Sheets

(56) References Cited

U.S. PATENT DOCUMENTS

| | | | | |
|---|---|---|---|---|
| 2021/0233660 | A1 | 7/2021 | Omiya et al. | |
| 2022/0088410 | A1* | 3/2022 | Hibbard | A61N 5/1038 |

OTHER PUBLICATIONS

Isola et al., "Image-to-Image Translation with Conditional Adversarial Networks" Proceedings of IEEE Conference on Computer Vision and Pattern Recognition, 2017, pp. 1125-1134.
Florkow et al., "Deep learning-based MR-to-CT synthesis: The influence of varying gradient echo-based MR images as input channels." Magnetic Resonance in Medicine, 2020, 83, pp. 1429-1441.
Goodfellow et al., "Generative Adversarial Nets", 2014, URL: https://arxiv.org/abs/1406.2661, 9 pages.
Combined Chinese Office Action and Search Report issued Dec. 18, 2025 in Chinese Patent Application No. 202211375234.5, 7 pages.
Isola et al., "Image-to-Image Translation with Conditional Adversarial Networks", arXiv:1611.07004v3 [cs.CV], Nov. 26, 2018, 17 pages.

* cited by examiner

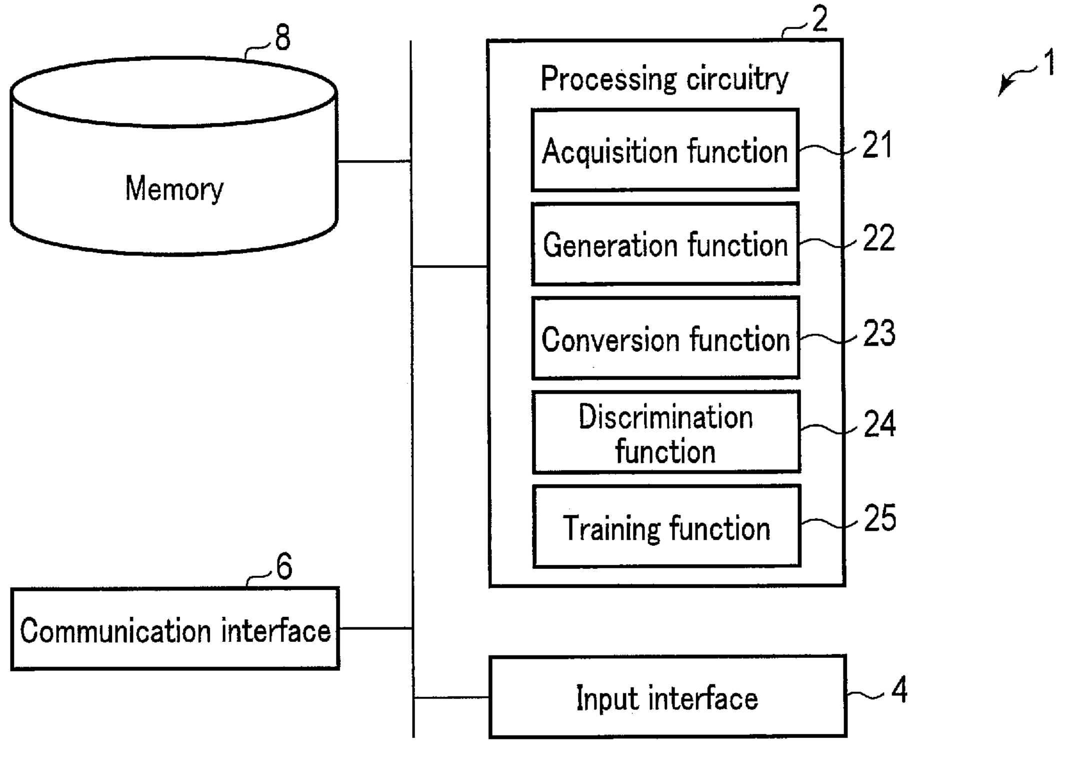
F I G. 1

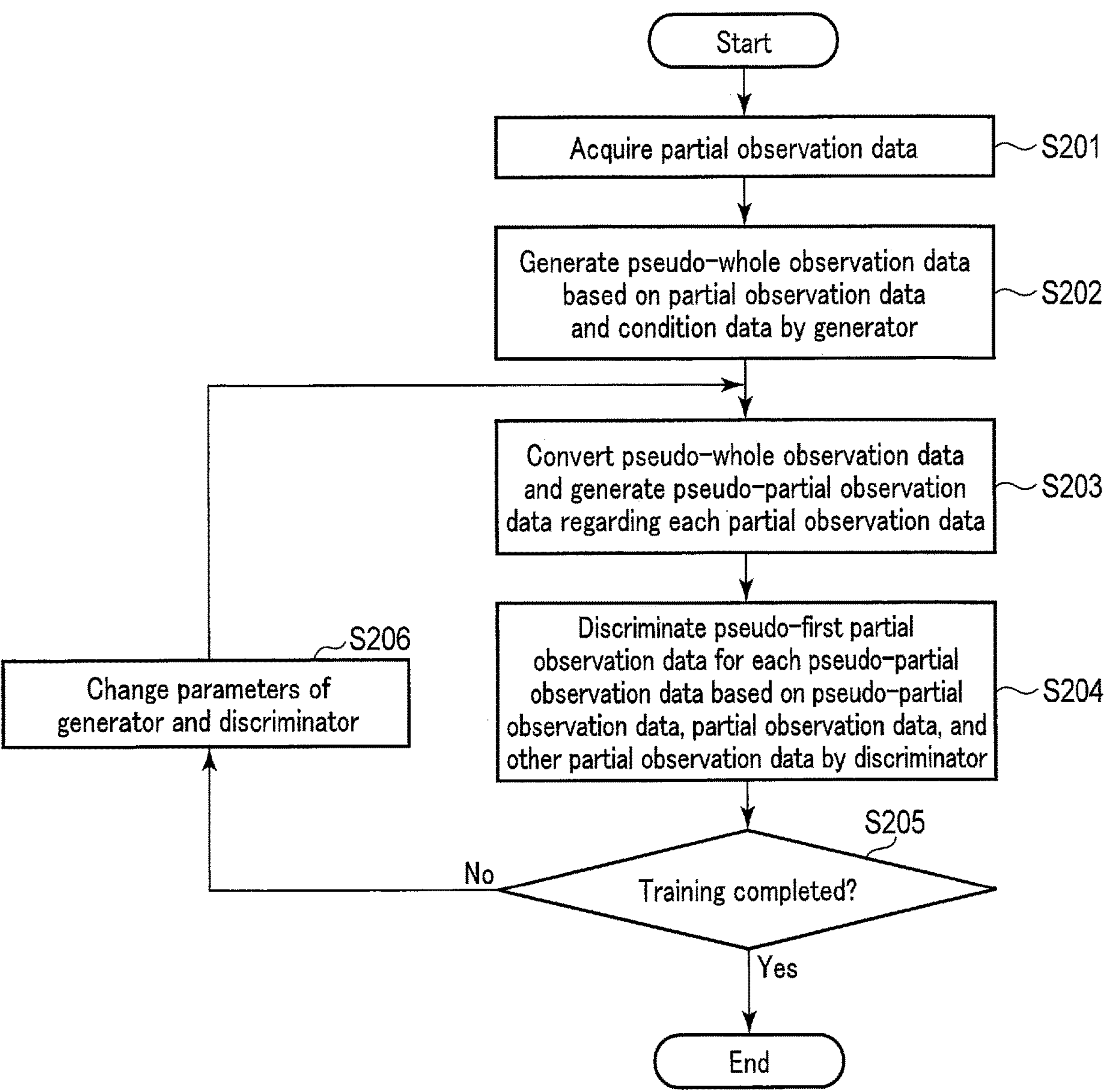
F I G. 2

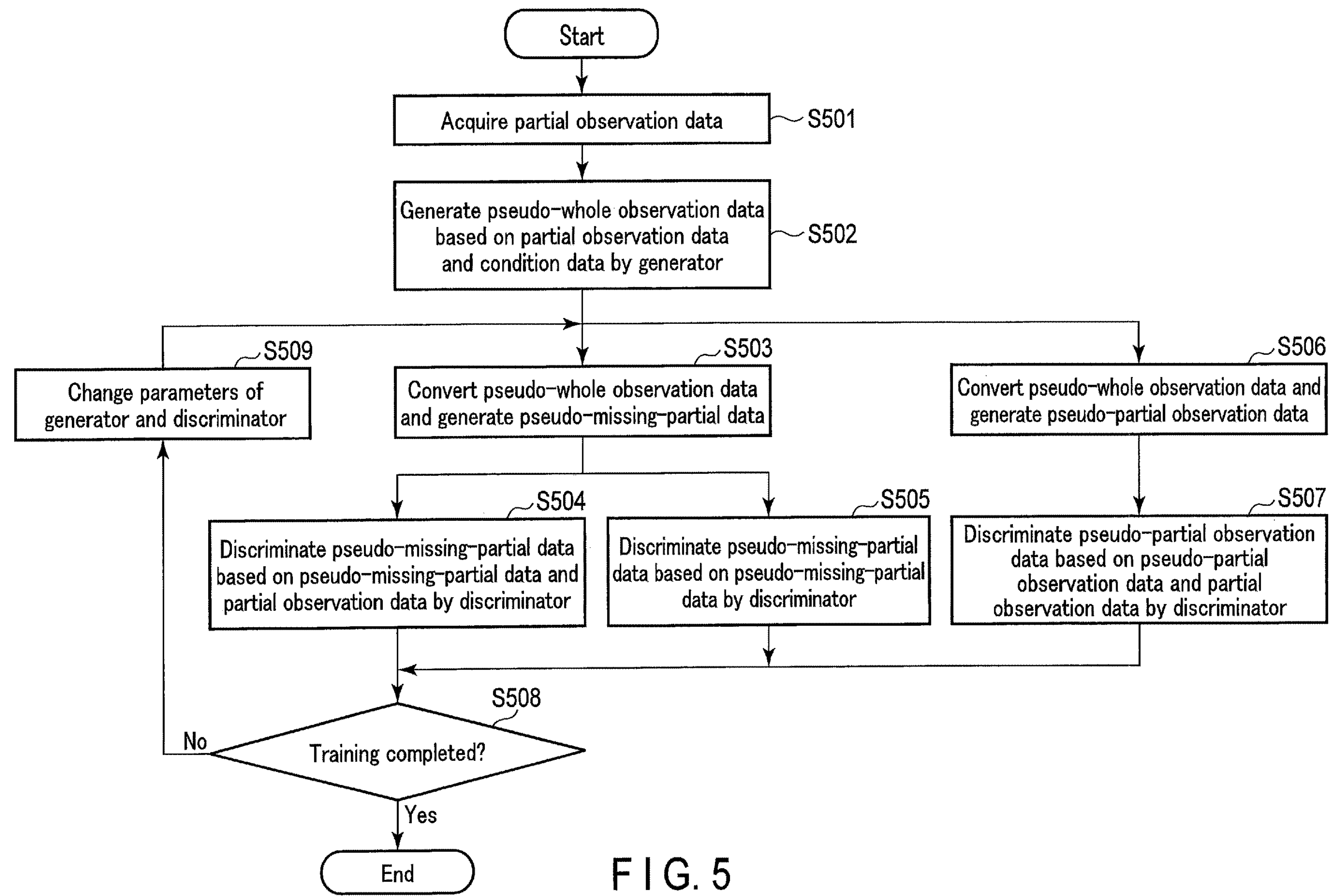
F I G. 5

PSEUDO-DATA GENERATION APPARATUS, PSEUDO-DATA GENERATION METHOD, LEARNING APPARATUS AND LEARNING METHOD

CROSS-REFERENCE TO RELATED APPLICATIONS

This application is based upon and claims the benefit of priority from Japanese Patent Applications No. 2021-181129, filed Nov. 5, 2021; and No. 2022-176429, filed Nov. 2, 2022; the entire contents of all of which are incorporated herein by reference.

FIELD

Embodiments described herein relate generally to a pseudo-data generation apparatus, a pseudo-data generation method, a learning apparatus and a learning method.

BACKGROUND

Machine learning such as a deep neural network has been applied to many fields, and various approaches have also been applied to the medical field. Machine learning presupposes the use of large amounts of data for training, and thus faces the problem of expected performance not being achieved without sufficient data yields. In the medical field especially, privacy protection rules and the like render it difficult to collect large amounts of various types of medical data, including a medical image.

Also, in the medical field, for example, some medical data are either hard to obtain or impossible to physically obtain, such as a three-dimensional volume magnetic resonance (MR) moving image (cine image). If such medical data can be utilized for correct data and the like, machine learning can be applied more widely, for which reason there is a need for utilization of such medical data.

BRIEF DESCRIPTION OF THE DRAWINGS

FIG. 1 is a block diagram showing a learning apparatus and a pseudo-data generation apparatus to a first embodiment.

FIG. 2 is a flowchart illustrating a training process of a learning apparatus according to the first embodiment.

FIG. 5 is a flowchart illustrating a training process of a learning apparatus according to a second embodiment.

DETAILED DESCRIPTION

Figure 3:
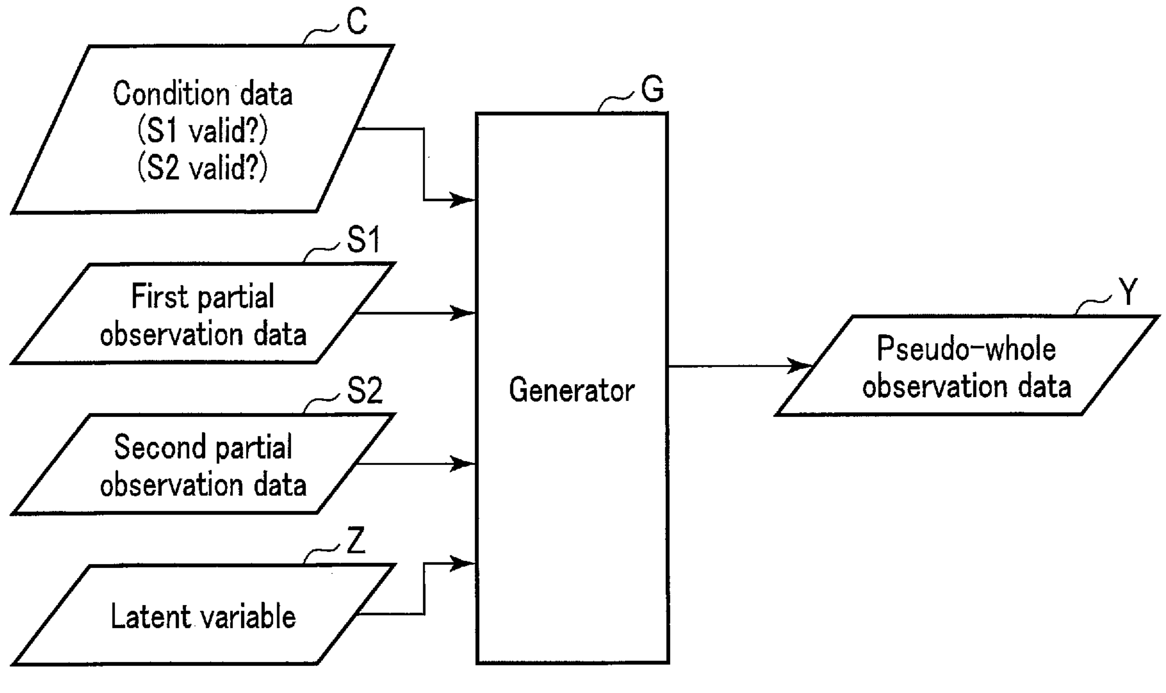
FIG. 3 is a conceptual diagram illustrating a generation process according to the first embodiment.

In general, according to one embodiment, a pseudo-data generation apparatus includes processing circuitry. The processing circuitry acquires one or more pieces of partial observation data that form part of whole observation data. The processing circuitry generates pseudo-whole observation data by inputting the one or more pieces of partial observation data to a function, the pseudo-whole observation data being pseudo-data of the whole observation data. The function is optimized by training so that partial observation data for training and pseudo-partial observation data for training resemble each other, the pseudo-partial observation data for training being obtained by converting the pseudo-whole observation data for training.

Hereinafter, a pseudo-data generation apparatus, a pseudo-data generation method, a pseudo-data generation program, a learning apparatus, a learning method, and a learning program according to the present embodiment will be described with reference to the drawings. In the following embodiments, elements assigned the same reference numeral perform the same operation, and repeat descriptions will be omitted as appropriate. Hereinafter, an embodiment will be described with reference to the accompanying drawings.

First Embodiment

A learning apparatus and a pseudo-data generation apparatus according to a first embodiment will be described with reference to the block diagram shown in FIG. 1.

A learning apparatus 1 according to the first embodiment includes processing circuitry 2, an input interface 4, a communication interface 6, and a memory 8. The processing circuitry 2 includes an acquisition function 21, a generation function 22, a conversion function 23, a discrimination function 24, and training function 25. The processing circuitry 2 includes a processor (not shown) as a hardware resource.

The acquisition function 21 acquires multiple pieces of partial observation data that may be part of the whole observation data. The whole observation data shows data that is not easy to acquire. For example, in a magnetic resonance imaging (MRI) apparatus, a three-dimensional volume MR moving image is not easy to acquire. On the other hand, partial observation data corresponding to a part of the configuration of the data that is not easy to acquire can often be relatively easily acquired. For example, a two-dimensional moving image concerning a slice cross-section or a three-dimensional volume image (still image) can be acquired via a normal imaging method.

The generation function 22 generates pseudo-whole observation data, which is pseudo-data of the whole observation data, from the multiple pieces of partial observation data. Herein, it is assumed that, for example, a generator of a conditional generative adversarial network (cGAN) (also referred to a "generation model" or a "function") is used. Not only the cGAN but also a decoder of a conditional variational auto encoder (cVAE) or a model trained using a conditional diffusion model may be used.

The conversion function 23 converts the pseudo-whole observation data into pseudo-first partial observation data, which is pseudo-data of first partial observation data among the multiple pieces of partial observation data.

The discrimination function 24 evaluates, using a loss function, a value discriminating whether the first partial observation data is true data or pseudo-data based on the pseudo-first partial observation data or the first partial observation data, and based on partial observation data that is not the first partial observation data among the multiple pieces of partial observation data. Herein, it is assumed that, for example, that a discriminator of CGAN (also referred to as a "discrimination model") is used. If both the pseudo-first partial observation data and the first partial observation data are available in the training process, a square error of the pseudo-first partial observation data and the first partial observation data, for example, may be evaluated in a loss function, or a weighted sum of an output value of the discriminator of CGAN and an output value of the square error, for example, may be evaluated in a loss function.

The training function 25 optimizes parameters of the generator used in the generation function 22 and the discriminator used in the discrimination function 24, so that the pseudo-first partial observation data is determined to be true data by the discriminator. For example, if the square error is used in the training function 25, the parameters of the generator used in the generation function 22 are optimized so that the pseudo-first partial observation data resembles the first partial observation data.

The input interface 4 includes circuitry that receives various instructions and information input from a user. The input interface 4 includes circuitry relating to, for example, a pointing device such as a mouse, or an input device such as a keyboard. The circuitry included in the input interface 4 is not limited to circuitry relating to a physical operational component such as a mouse or a keyboard. For example, the input interface 4 may include electrical signal processing circuitry, which receives an electrical signal corresponding to an input operation from an external input device provided separately from the learning apparatus 1 and outputs the received electrical signal to various circuits in the learning apparatus 1 or pseudo-data generation apparatus.

The communication interface 6 performs data exchange with an external apparatus via a cable or wirelessly. For example, the communication interface 6 performs data communication with a workstation, radiology information systems (RIS) server, and picture archiving and communication systems (PACS) server.

The memory 8 stores a data set of partial observation data, pseudo-whole observation data and the like, a trained model, etc. The memory 8 is a semiconductor memory element such as a random access memory (RAM) and a flash memory, a hard disk drive (HDD), a solid state drive (SSD), an optical disk, etc. The memory 8 may be, for example, a CD-ROM drive, a DVD drive, or a drive which reads and writes various kinds of information from and in a portable storage medium such as a flash memory.

The pseudo-data generation apparatus, when operating after the training is performed by the learning apparatus 1, may have a configuration that includes processing circuitry 2 including the acquisition function 21 and the generation function 22, an input interface 4, a communication interface 6, and a memory 8.

The acquisition function 21 acquires one or more pieces of partial observation data.

The generation function 22 generates pseudo-whole observation data by inputting one or more pieces of partial observation data to a function.

The various functions of the processing circuitry 2 may be stored in the memory 8 in the form of a program executable by a computer. In this case, the processing circuitry 2 can also be said to be a processor for reading programs corresponding to these various functions from the memory 8, and executing the programs to thereby implement the functions corresponding to the respective programs. In other words, the processing circuitry 2 which has read the respective programs has multiple functions, etc., shown in the processing circuitry 2 in FIG. 1.

FIG. 1 illustrates the case where the various functions are realized in single processing circuitry 2; however, the processing circuitry 2 may be constituted from a combination of a plurality of independent processors, and the functions may be realized by the processors respectively executing the programs. In other words, the above-described functions may be configured as programs, and the programs may be executed by single processing circuitry; alternatively, specific functions may be mounted in independent program-execution circuitry specific to the functions.

Next, the training process of the learning apparatus 1 according to the first embodiment will be explained with reference to the flowchart of FIG. 2.

In step S201, the processing circuitry 2 acquires multiple pieces of partial observation data through the acquisition function 21.

In step S202, the processing circuitry 2 generates pseudo-whole observation data using a generator based on the multiple pieces of partial observation data and condition data through the generation function 22.

In step S203, the processing circuitry 2 performs a conversion process on the pseudo-whole observation data through the conversion function 23 and generates pseudo-partial observation data for each of the multiple pieces of partial observation data. Ideally, the conversion process through the conversion function 23 takes the form of conversion that, if it is assumed that real whole observation data is obtained, would make pseudo-partial observation data after conversion, which is generated by converting the real whole observation data, be the same as its corresponding partial observation data.

In step S204, the processing circuitry 2 discriminates, through the discrimination function 24, whether the pseudo-partial observation data is real data (i.e., partial observation data) or fake data (i.e., data that is not partial observation data) based on the pseudo-partial observation data, the partial observation data, and other partial observation data using a discriminator. The discrimination process using the discriminator is performed on corresponding partial observation data for each pseudo-partial observation data generated in step S203. Also, in the discrimination process, a value of the probability (likelihood) that the pseudo-partial observation data is real data is, for example, output from the discriminator.

In step S205, the processing circuitry 2, through the training function 25, determines whether or not the training is completed. For example, the processing circuitry 2 may determine that the training is completed if a value of a loss function of cGAN, for example, a value of a loss function using binary cross entropy is equal to or less than a threshold. Alternatively, the processing circuitry 2 may determine that the training is completed if the number of epochs of training is equal to or greater than a predetermined number of times, and any determination criterion may be used as long as it is a determination method concerning completion of training used in GAN and machine learning. If the training is completed, the process is terminated, and the parameters of the generator and the discriminator are optimized. If the training is not completed, the process proceeds to step S206.

In step S206, the parameters (such as a weight coefficient) of the generator and the discriminator are changed, and the process returns to step S203 to repeat the same process. The parameters of the generator are adjusted so that the generator generates pseudo-partial observation data that the discriminator discriminates (recognizes) as real data (i.e., the partial observation data acquired in step S201).

On the other hand, the parameters of the discriminator are adjusted so that the discriminator can identify that the pseudo-partial observation data generated by the generator is fake data. As explained above, the generator and the discriminator are reciprocally trained by the training process shown in FIG. 2, and the training is completed.

In the example shown in FIG. 2, the discrimination function 24 performs authenticity determination of whether the pseudo-partial observation data is real data or fake data; however, the embodiment is not limited thereto. For example, a mean squared error or a mean absolute value error of partial observation data and partial observation data, or a weighted sum of the mean squared error (or mean absolute value error) and an output value of the discriminator, may be evaluated in a loss function. For example, it suffices that the parameters of the generator and the discriminator are optimized by the training function 25 so that a loss value based on the loss function becomes minimal.

Next, the generation process through the generation function 22 according to the first embodiment will be described with reference to the conceptual diagram shown in FIG. 3.

FIG. 3 shows an example of input-output data concerning a generator G of cGAN used in the first embodiment.

First partial observation data S1 corresponding to the first partial observation data, second partial observation data S2 corresponding to the second partial observation data, a latent variable z, and condition data C are input to the generator G. The latent variable z is a variable in a latent space given to the generator G of GAN, and a predetermined range of pseudo-random number is used herein. The condition data C is data indicating whether each of the first partial observation data S1 and the second partial observation data S2 is valid or not, and it is assumed herein that a one-hot vector is used. The one-hot vector is, for example, a vector in which "1" is allocated if there is partial observation data input to the generator G, which is determined as "valid", and "0" is allocated if there is no partial observation data input to the generator G, which is determined as "invalid". Pseudo-whole observation data Y is output from the generator G.

Next, the discrimination process through the discrimination function 24 according to the first embodiment will be described with reference to the conceptual diagram shown in FIG. 4.

Figure 4:
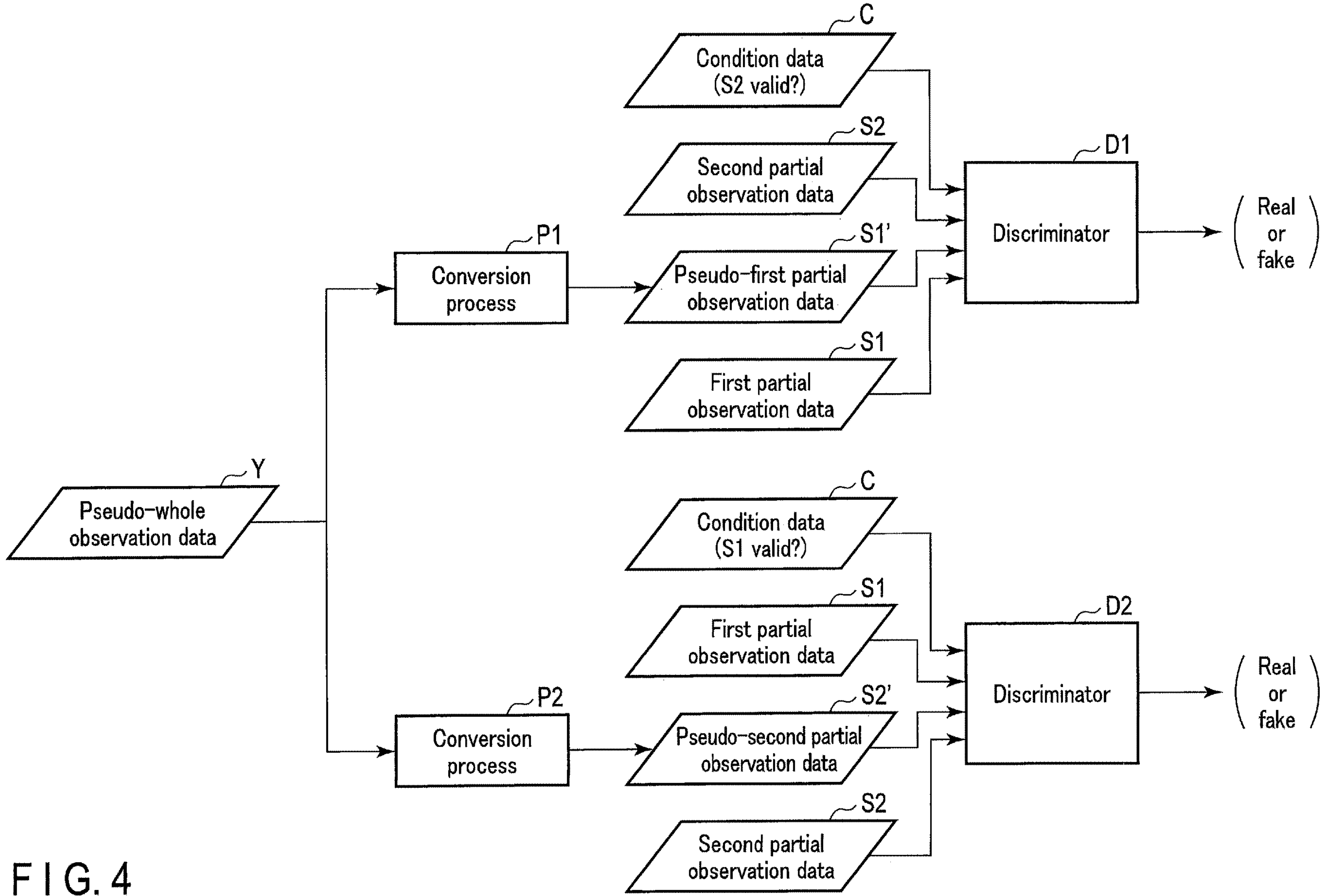
FIG. 4 is a conceptual diagram illustrating a discrimination process according to the first embodiment.

FIG. 4 shows an example of input-output data concerning a discriminator D of cGAN used in the first embodiment. A plurality of discriminators D are prepared, as in discriminator D1 and discriminator D2, in accordance with the number of partial data.

First, a conversion process P1 is performed on the pseudo-whole observation data Y generated by the generator G through the conversion function 23, and pseudo-first partial observation data S1' is generated. Likewise, a conversion process P2 is performed on the pseudo-whole observation data Y through the conversion function 23, and pseudo-second partial observation data S2' is generated.

The pseudo-first partial observation data S1' generated, the first partial observation data S1, the second partial observation data S2, and the condition data C are input to the discriminator D1. Herein, the condition data C input to the discriminator D1 indicates that the second partial observation data S2 is valid. The condition data C need not be input to the discriminator D1, since inputting known data (e.g., all zero) as the second partial observation data S2 instead of inputting the condition data C when no data exists renders it possible to perform processing irrespective of whether the second partial observation data S2 is valid or not.

The discriminator D1 discriminates whether the pseudo-first partial observation data S1' is the same as the first partial observation data S1, that is, real data, or the pseudo-first partial observation data S1' is fake data. Herein, the second partial observation data S2 is input to refer to the correlation between the partial observation data. As an example for assisting understanding, a case is assumed in which the first partial observation data S1 is an upper half image of a whole image and the second partial observation data S2 is a lower half image of the whole image. In this case, the second partial observation data S2 is input to the discriminator D1, which thereby performs discrimination while considering whether the connection between the pseudo-first partial observation data S1' and the second partial observation data S2 is favorable or not.

On the other hand, the pseudo-second partial observation data S2' generated, the second partial observation data S2, the first partial observation data S1, and the condition data C are input to the discriminator D2 in a similar manner. The condition data C input to the discriminator D2 indicates that the first partial observation data S1 is valid. The condition data C need not be input to the discriminator D2, since inputting known data as the first partial observation data S1 instead of inputting the condition data C when no data exists makes it possible to perform processing irrespective of whether the first partial observation data S1 is valid or not.

The discriminator D2 discriminates whether the pseudo-second partial observation data S2' is the same as the second partial observation data S2, that is, real data, or the pseudo-second partial observation data S2' is fake data.

In the training of the generator G shown in FIG. 3 and the discriminators D1 and D2 shown in FIG. 4, the parameters of the generator G and the discriminators D1 and D2 may be reciprocally optimized to satisfy the conditions described below.

As for the generator G, the parameters for generating the pseudo-whole observation data Y are adjusted so that the pseudo-first partial observation data S1' recognized as real data (i.e., the first partial observation data S1) by the discriminator D1 and the pseudo-second partial observation data S2' recognized as real data (i.e., the second partial observation data S2) by the discriminator D2 are generated.

On the other hand, the parameters of the discriminator D1 are adjusted so that the discriminator D1 can identify that the pseudo-first partial observation data S1' is fake data (i.e., data that is not the first partial observation data S1). Likewise, the parameters of the discriminator D2 are adjusted so that the discriminator D2 can identify that the pseudo-second partial observation data S2' is fake data (i.e., data that is not the second partial observation data S2).

When the training of the generator G and the discriminators D1 and D2 is completed, the pseudo-data generation apparatus can generate, by using the generator G shown in FIG. 3, pseudo-whole observation data similar to whole observation data that is not easy to observe.

Specifically, the acquisition function 21 of the pseudo-data generation apparatus acquires the first partial observation data S1 and the second partial observation data S2.

The generation function 22 of the pseudo-data generation apparatus inputs, to the generator G for which training has been completed, the first partial observation data S1, the second partial observation data S2, condition data indicating that the first partial observation data S1 and the second partial observation data S2 are valid, and the latent variable z, and can obtain the pseudo-whole observation data Y as output of the generator G.

In the example described above, partial observation data used to generate pseudo-whole observation data is not limited to the two kinds of partial observation data that are the first partial observation data S1 and the second partial observation data S2, and a case where three (kinds) or more of partial observation data are used to generate pseudo-whole observation data is likewise applicable. In the case of using three kinds of partial observation data, for example, a discriminator D3 which discriminates pseudo-third partial observation data S3' generated through conversion of third partial observation data S3 and the pseudo-whole observation data Y may further be set, in addition to the above-described discriminators D1 and D2.

In the case of using three or more kinds of partial observation data, the partial observation data input to each discriminator D may be all other partial observation data or a combination thereof.

For example, all other partial observation data, which are the first partial observation data S1 and the second partial observation data S2, may be input to the discriminator D3, in addition to the pseudo-third partial observation data S3' and the third partial observation data S3. Alternatively, either the first partial observation data S1 or the second partial observation data S2 may be input according to pseudo-whole observation data that is desired to be generated. Specifically, in the case where the third partial observation data S3 is adjacent to the second partial observation data S2 and not adjacent to the first partial observation data S1 in pseudo-whole observation data, the pseudo-third partial observation data S3', the third partial observation data S3, and the second partial observation data S2 may be input to the discriminator D3.

Furthermore, any number of discriminators D may be prepared to correspond to the number of possible combinations of partial observation data.

According to the first embodiment described above, a discriminator that discriminates partial observation data is prepared from partial observation data that is relatively easy to observe for each partial observation data using cGAN, for example. Pseudo-whole observation data generated from partial observation data is converted into pseudo-partial observation data, which is pseudo-data of each partial observation data. Through the training process, discrimination of the partial observation data and the pseudo-partial observation data is performed for each partial observation data. The generator and the multiple discriminators are reciprocally trained. When an inference is to be made, the partial observation data is input to the generator after the training thereof has been completed, so that pseudo-whole observation data for whole observation data either impossible or difficult to observe can be generated.

The pseudo-whole observation data can also be used as fake data for display in the applications such as machine learning, product testing, education, and the like that make use of an image when it is hard to prepare whole observation data or unnecessary to use whole observation data.

Second Embodiment

A second embodiment assumes a case where a part of the partial observation data for configuring pseudo-whole observation data is missing.

The configurations of the function blocks of the learning apparatus 1 and the pseudo-data generation apparatus according to the second embodiment are the same as those of the learning apparatus 1 and the pseudo-data generation apparatus according to the first embodiment.

The training process of the learning apparatus according to the second embodiment will be explained with reference to the flowchart show in FIG. 5.

In step S501, the processing circuitry 2 acquires partial observation data through the acquisition function 21. Herein, a case is assumed where a part of the multiple pieces of partial observation data available as the configuration of whole observation data cannot be acquired.

In step S502, the processing circuitry 2 generates pseudo-whole observation data using a generator based on the partial observation data and condition data through the generation function 22.

In step S503, the processing circuitry 2 performs a conversion process on the pseudo-whole observation data through the conversion function 23 and generates pseudo-missing-partial data, which is pseudo-data of partial observation data that could not be acquired.

In step S504, the processing circuitry 2 discriminates, through the discrimination function 24, that the pseudo-missing-partial data is fake data (i.e., data that is not partial observation data) based on the pseudo-missing-partial data and the partial observation data using a discriminator.

In step S505, the processing circuitry 2 discriminates, through the discrimination function 24, that the pseudo-missing-partial data is fake data using a discriminator based on the pseudo-missing-partial data and without using the partial observation data.

In step S506, the processing circuitry 2 performs a conversion process on the pseudo-whole observation data through the conversion function 23 and generates pseudo-partial observation data.

In step S507, the processing circuitry 2 discriminates, through the discrimination function 24, whether the pseudo-partial observation data is real data (i.e., partial observation data) or fake data (i.e., data that is not partial observation data) based on the pseudo-partial observation data and the partial observation data using a discriminator.

In step S508, the processing circuitry 2 determines, through the training function 25, whether or not the training is completed. The determination of whether or not the training is completed is the same as that of step S207 described in FIG. 2. If the training is completed, the process is terminated, and the parameters of the generator and the discriminator are optimized. If the training is not completed, the process proceeds to step S509.

In step S509, the parameters of the generator and the discriminator are changed, and the process returns to steps S503 and S506 so as to be repeated.

Next, the generation process through the generation function 22 according to the second embodiment will be described with reference to the conceptual diagram shown in FIG. 6.

The example shown in FIG. 6 and the example shown in FIG. 7, to be explained later, assume a case where the first partial observation data S1 is missing partial-data due to an inability to acquire the first partial observation data S1 when acquisition of the first partial observation data S1 and the second partial observation data S2 is desired. Since FIG. 6 shows the inability to acquire the first partial observation data S1, the first partial observation data S1 is shown in a block with a broken line and a cross mark (cross-out).

The second partial observation data S2, the condition data C, and the latent variable z are input to the generator G. The condition data C may be information indicating that the first partial observation data S1 is invalid and the second partial observation data S2 is valid. For example, a one-hot vector of [S1, S2] may be expressed as [0, 1].

The process performed by the generator G does not greatly differ from that described in the first embodiment, and the pseudo-whole observation data Y is generated from the second partial observation data S2 successfully acquired, the condition data C, and the latent variable z without using the missing first partial observation data S1.

Next, the discrimination process through the discrimination function 24 according to the second embodiment will be described with reference to FIG. 7.

Figure 6:
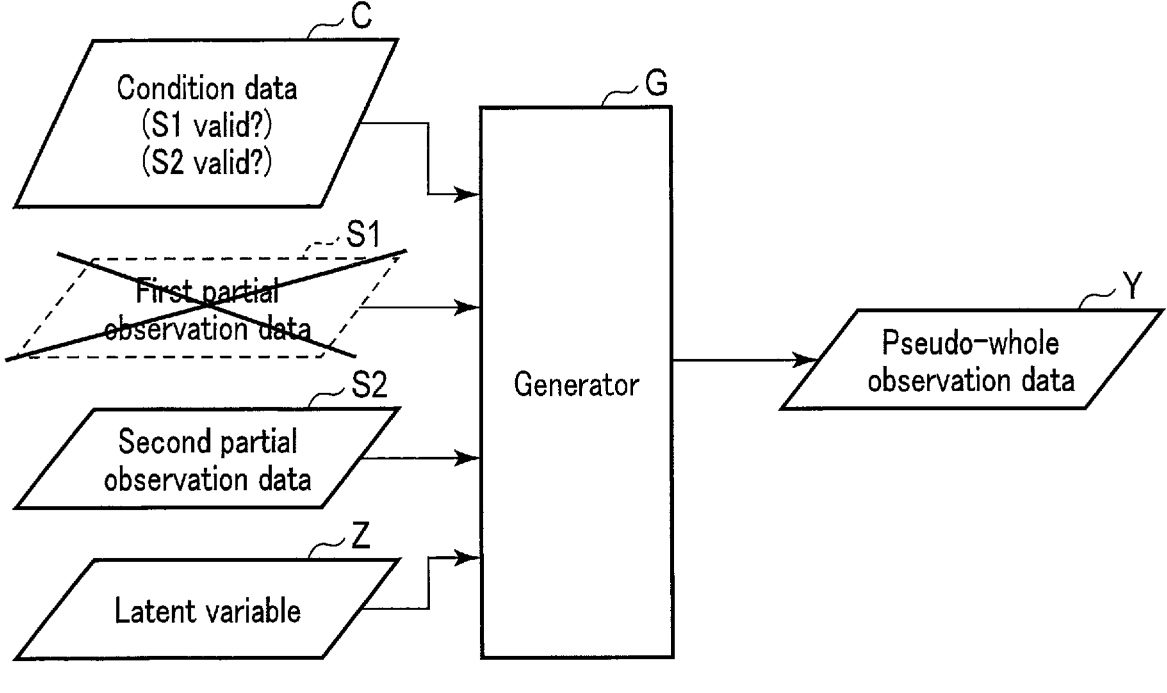
FIG. 6 is a conceptual diagram illustrating a generation process according to the second embodiment.
Figure 7:
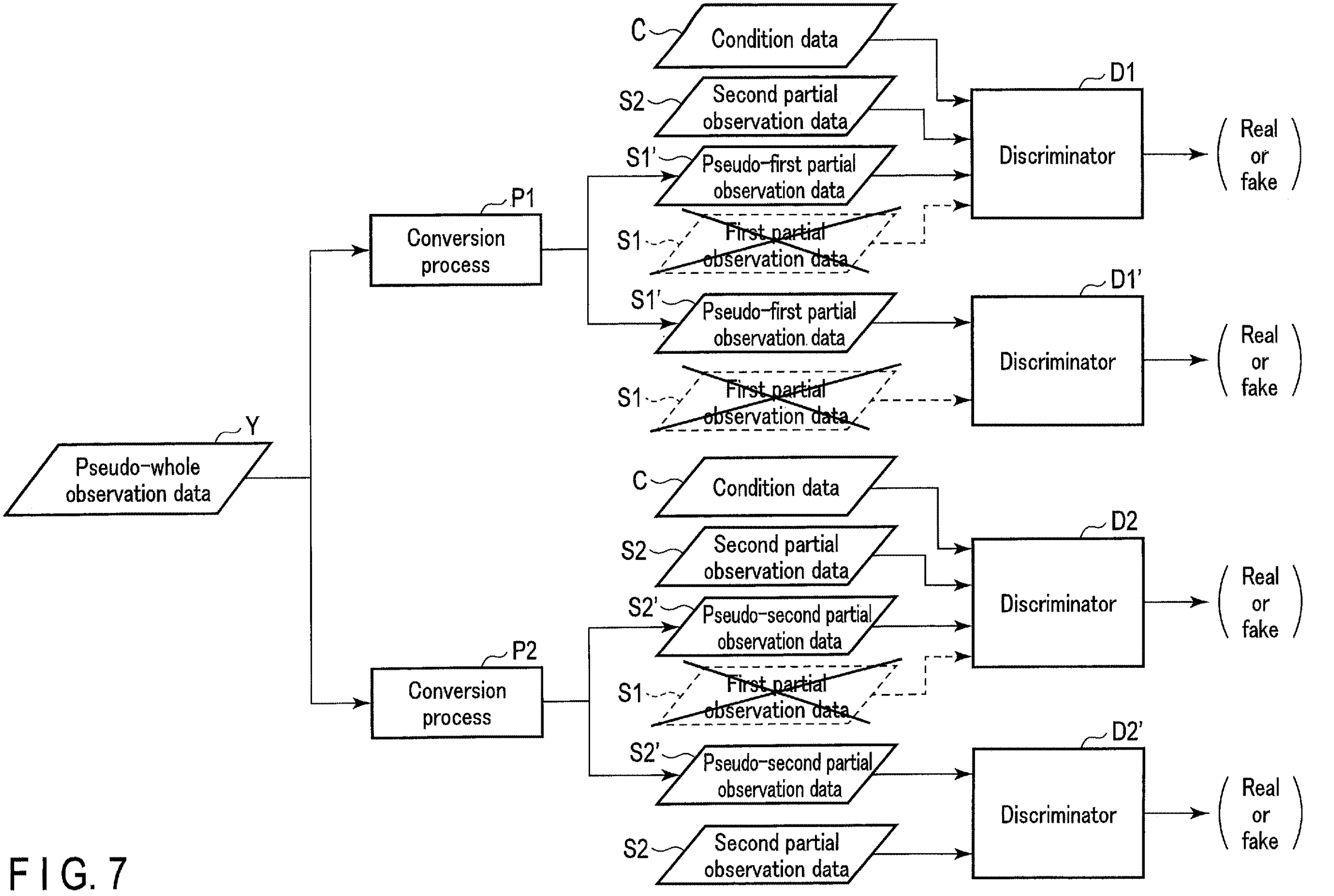
FIG. 7 is a conceptual diagram illustrating a discrimination process according to the second embodiment.

In FIG. 7, the process up to generation of the pseudo-first partial observation data S1' and the pseudo-second partial observation data S2' after performance of the conversion process on the pseudo-whole observation data generated by the generator G shown in FIG. 6 is the same as that described in the first embodiment. In the discrimination process according to the second embodiment, a plurality of discriminators D are designed according to the presence or absence of the condition data input to the discriminators D.

For example, in the case of discriminators that identify the pseudo-first partial observation data S1', "S2=1" and "S2=0" can be set as the condition data C for the second partial observation data S2 that is input together. Accordingly, a discriminator D1 to which the second partial observation data S2 and its condition data C [S2=1 or 0] are input, and a discriminator D1' to which neither the condition data C nor the second partial observation data S2 is input are set.

Specifically, since the second partial observation data S2 is input to the discriminator D1, the condition data C [S2=1], the acquired second partial observation data S2, and the pseudo-first partial observation data S1' are input to the discriminator D1. The discriminator D1 discriminates whether the pseudo-first partial observation data S1' is real data or fake data when it is given the second partial observation data S2.

On the other hand, since the discriminator D1' is a discriminator for the case where the second partial observation data S2 does not exist as an input, and the first partial observation data S1 is also missing, the pseudo-first partial observation data S1' is input alone to the discriminator D1'. The discriminator D1' discriminates that the pseudo-first partial observation data S1' is fake data. The training for the discriminator D1' to identify that the data is real data is performed based on the data containing the first partial observation data S1. The discriminator D1' is in the same state as that in which the first partial observation data S1 as correct data is not input to a discriminator of a general unconditional GAN.

Likewise, in the case of a discriminator that discriminates the pseudo-second partial observation data S2', [S1=1] and [S1=0] can be set as the condition data C for the first partial observation data S1 to be input together. Thus, a discriminator D2 given the first partial observation data S1 and its condition data C [S1=1 or 0] as an input, and a discriminator D2' not given the condition data C or the first partial observation data S1 as an input are set.

Herein, since the first partial observation data S1 is missing, the discriminator D2 has two cases: the case where training is performed in which the condition data C [S1=0] and the pseudo-second partial observation data S2' are input to the discriminator D2 and identified as fake data; and the case where training is performed in which the condition data C [S1=0] and the second partial observation data S2 are input to the discriminator D2 and identified as real data. Also, the discriminator D2' has two cases: the case where training is performed in which the pseudo-second partial observation data S2' is input to the discriminator D2' and identified as fake data; and the case where training is performed in which the second partial observation data S2 is input to the discriminator D2' and identified as real data. Consequently, the discriminator D2' is the same as one that discriminates the pseudo-second partial observation data S2' of a general GAN (without condition).

While the first partial observation data S1 is missing, processing is performed using a discriminator under the condition of condition data C [S1=0] as the discriminator D2 and a discriminator with no preconditions as the discriminator D2'. Therefore, each of the discriminator D2 and the discriminator D2' is trained by the pseudo-second partial observation data S2'.

Next, a modification of the discrimination process according to the second embodiment will be described with reference to FIG. 8.

Figure 8:
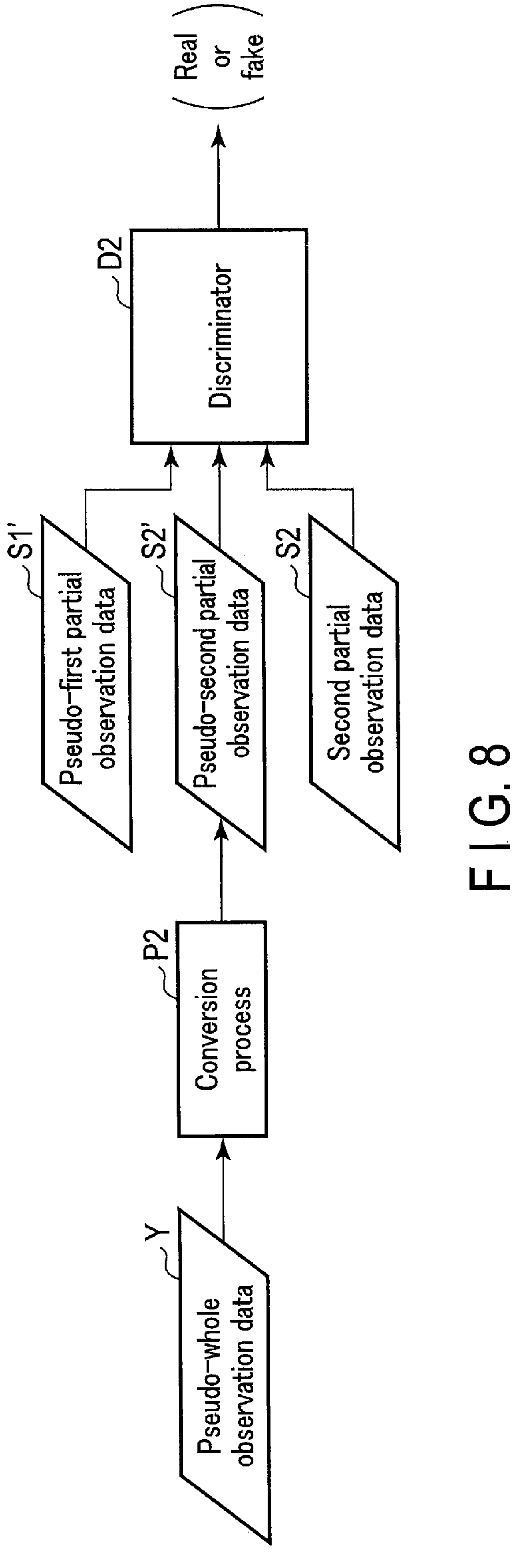
FIG. 8 is a conceptual diagram illustrating a modification of the generation process according to the second embodiment.

As shown in FIG. 8, if pseudo-partial observation data of acquired partial observation data is to be identified, or in this example, if the pseudo-second partial observation data S2' is to be identified, the pseudo-first partial observation data S1' related to the missing first partial observation data may be input to the discriminator D2. Namely, instead of the first partial observation data S1, the pseudo-first partial observation data as pseudo-data may be input, and a discrimination process of the pseudo-second partial observation data S2' may be performed in the discriminator D2.

According to the second embodiment described above, even if partial observation data is missing, pseudo-partial observation data of missing partial observation data is generated from pseudo-whole observation data, and training is performed so that the acquired partial observation data and the pseudo-partial observation data of the missing partial observation data are identified by the discriminator. Thereby, pseudo-whole observation data can be generated in the same manner as described in the first embodiment.

(Examples of Partial Observation Data)

Next, specific examples of the partial observation data and the whole observation data according to the first embodiment and the second embodiment will be described.

For example, if target data is an image, a patch image with respect to an entire image may be used as partial observation data. If target data is spectral data, partial spectral data with respect to an entire spectrum may be used as partial observation data, and may be used as is if it corresponds to a part of synthetic spectrum.

Specifically, if target data is an image, the learning apparatus and the pseudo-data generation apparatus according to the above-described embodiments can generate a super-resolution image as pseudo-whole observation data from a first resolution image (low-resolution image) having a first resolution as the first partial observation data, and a second resolution image (high-resolution image) having a second resolution higher than the first resolution as the second partial observation data.

Next, an example of generating partial observation data in the case of simultaneously acquiring an image and a spectrum will be described with reference to FIG. 9.

Figure 9:
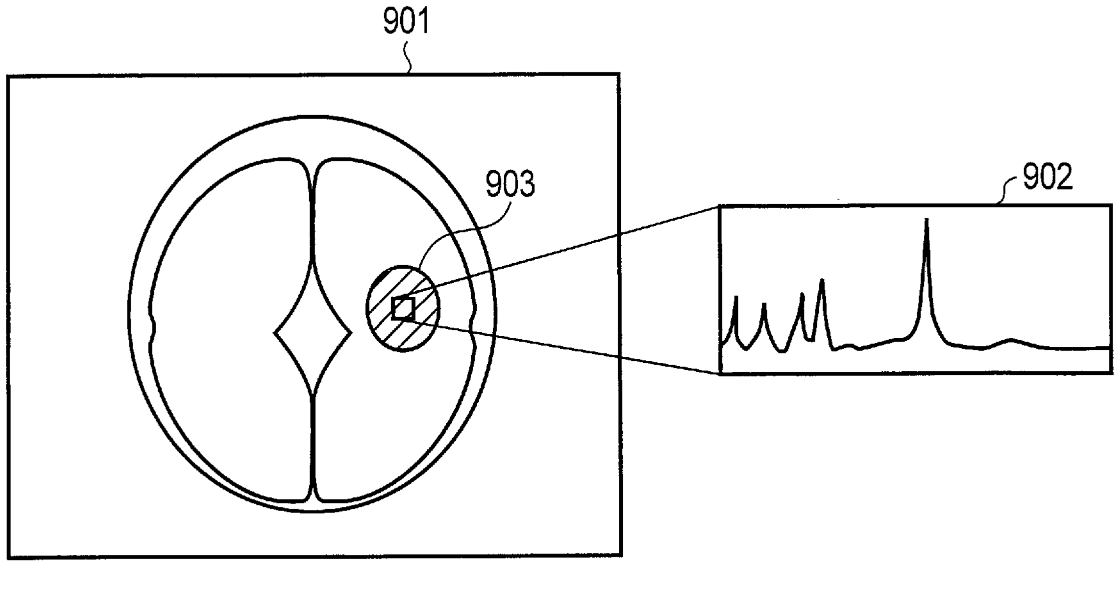
FIG. 9 is a diagram showing a generation example of partial observation data.

FIG. 9 shows an example of an MR image 901 of the brain acquired by an MRI apparatus and a spectrum 902 according to MR spectroscopy (MRS). In the case of simultaneously observing the MR image 901 and the spectrum 902, a resolution of the MR image and a resolution of a region of interest (ROI) when collecting the MRS spectrum often differ from each other.

Thus, as a first method of acquiring partial observation data, the MR image is segmented first. Then, a segmentation region is compared with a pixel region in the ROI according to the MRS. If the pixel region in the ROI according to the MRS is included in the segmentation region, each pixel included in the segmentation region may be associated with the spectrum.

Specifically, in FIG. 9, it is supposed that segmentation processing of the MR image 901 is performed, a tumor site is segmented, and a segmentation region 903 is obtained. Herein, since the ROI in the spectrum 902 according to the MRS is included in the segmentation region 903, each pixel of the segmentation region 903 is associated with the spectrum 902. Thereby, partial observation data of the spectrum corresponding to each pixel can be generated.

If a spectrum corresponding to the segmentation region 903 cannot be collected, the spectrum will be deemed missing for the segmentation region.

As a second method of acquiring partial observation data, multiple spectra according to the MRS are acquired for a given ROI. A position of the pixels of the ROI according to the MRS on the MR image is determined, and a pixel region of the MR image superimposed on the ROI according to the MRS is associated with a value of the spectrum. On the other hand, a pixel region not superimposed on the ROI according to the MRS may be associated, by nearest neighbor interpolation, with a value of an acquired spectrum having the closest Euclidean distance. Not only the nearest neighbor interpolation but also other interpolation methods such as bilinear interpolation and bicubic interpolation may be used.

The spectrum 902 may use data of molecular classification into multiple kinds such as choline (Cho), N-acetylaspartic acid (NAA), etc., made in advance.

The partial observation data described above may be acquired by the processing circuitry 2 through the acquisition function 21 after the processing circuitry 2 performs the processing explained with reference to FIG. 9 when acquiring the partial observation data, or the processing circuitry 2 may perform the processing explained with reference to FIG. 9 through a preprocessing function (not illustrated) or the like.

In this manner, an MR image, an MR moving image, and one-dimensional MRS are acquired as partial observation data. If the MR image is acquired through the generation function 22, a two-dimensional chemical shift imaging (CSI) image can be generated as pseudo-whole observation data, and if the MR moving image is acquired through the generation function 22, a CSI moving image can be generated as pseudo-whole observation data.

As another example to be applied to an MR image, a three-dimensional image before contrast imaging, a three-dimensional image after contrast imaging, and a moving image regarding a contrast curve may be used as partial observation data, and a three-dimensional contrast reconstruction image may be used as pseudo-whole observation data. By training the generator and the discriminator using the partial observation data, a three-dimensional contrast moving image that is not easy to acquire can be acquired.

In addition, enhanced images such as a T1 enhanced image, a T2 enhanced image, and a diffusion enhanced image may be used as partial observation data, and a T1 map (T1 image), a T2 map (T2 image), a diffusion image, etc., based on true parameter values may be used as pseudo-whole observation data. By training the generator and the discriminator using the partial observation data, a value similar to a true parameter value that cannot be acquired in the current state can be acquired as pseudo-whole observation data.

In addition, the partial observation data is not limited to the examples of the MR image, and may be medical data that can be acquired by other medical image diagnostic apparatuses. For example, in the case of an X-ray computed tomography (CT) apparatus, an image for an energy distribution of a photon counting CT apparatus that discriminates energy of photons or a dual energy CT apparatus that uses two types of tube voltage may be used as partial observation data, and a material discrimination image of a reference material such as iodine and water may be used as pseudo-whole observation data.

In addition to the above, the pseudo-data generation apparatus may be connected to any of an X-ray imaging apparatus, a positron emission tomography (PET) apparatus, a single photon emission computed tomography (SPECT) apparatus, an ultrasonic diagnosis apparatus, or the like, and may generate pseudo-whole observation data that may be constructed from partial observation data using medical data acquired by the connected medical image diagnostic apparatus as the partial observation data.

As a matter of course, not only medical data but also a generally obtainable image such as a fixed-point monitoring image captured by a closed circuit television, a microscopic image captured by a microscope may be used as partial observation data.

For example, a specific viewpoint image of an imaging target captured from multiple sites may be used as partial observation data, and a surface rendering-like three-dimensional image may be used as pseudo-whole observation data. Furthermore, by adjusting the focus of a lens, multiple position images and depth information may be used as partial observation data, and a depth image may be used as pseudo-whole observation data.

Thereby, the acquisition function 21, for example, of the pseudo-data generation apparatus acquires multiple images captured while shifting the focus as multiple pieces of partial observation data.

The generation function 22 can generate three-dimensional volume data having depth information as pseudo-observation data from the multiple pieces of partial observation data.

(Regularization of Whole Observation Data)

If there are insufficient types of partial observation data constituting whole observation data, or if there are insufficient numbers of partial observation data constituting whole observation data, the models of the generator and the discriminator may be over-trained. Thus, to prevent overtraining, regularization may be performed on the whole observation data.

For example, a penalty term may be added to a loss function for the training of the generator and the discriminator so that whether the data is smooth or not is taken into consideration. Specifically, if the pseudo-whole observation data is smooth, a penalty term that decreases in the total variation of the pseudo-whole observation data, in other words, a penalty term that decreases in the L2 norm, may be added.

If assumed whole observation data has symmetry in the horizontal direction and/or vertical direction, determination may be made as to whether the pseudo-whole observation data is symmetrical or not in the horizontal direction and/or vertical direction, and if the pseudo-whole observation data is not symmetrical in the horizontal direction and/or vertical direction, a penalty term that increases in value may be added.

Also, a penalty term that decreases in value as an error occurring when subjecting a collection of pseudo-whole observation data to low-rank approximation to a loss function used for training is lower may be added to the loss function.

If data is information generated from molecules or atoms, a penalty term that decreases in value as the data is sparser with respect to a specific axis (e.g., a frequency axis), that is, as the L1 norm is smaller, may be added to a loss function.

Data augmentation to increase the number of data by, for example, modifying or rotating the acquired partial observation data, may be performed. For the data augmentation, a general method adopted by those with ordinary skill in the art may be applied regardless of whether modification or rotation is performed.

Alternatively, if a super-resolved image is assumed as whole observation data, for example, generating pseudo-partial observation data from the super-resolved image may involve generating pseudo-partial observation data by shifting the position in an amount equal to or greater than an equivalent to one pixel in the spatial resolution of the super-resolved image. Specifically, a region on the super-resolved image is cut out while shifting the position by an amount of one or more pixels through using a window that designates a region for generating pseudo-partial observation data from super-resolved image in the conversion process. Thereby, the numbers of pseudo-partial observation data can be increased.

The learning apparatus 1 and the pseudo-data generation apparatus may be installed in at least one of a server, a workstation, or a medical image diagnostic apparatus.

According to at least one embodiment described above, pseudo-data of data that is not easy to observe can be generated.

Furthermore, the functions described in connection with the above embodiment may be implemented, for example, by installing a program for executing the processing in a computer, such as a workstation, etc., and expanding the program in a memory. The program that causes the computer to execute the above-described technique can be stored and distributed by means of a storage medium, such as a magnetic disk (a hard disk, etc.), an optical disk (CD-ROM, DVD, etc.), and a semiconductor memory.

Herein, the term "processor" used in the above description means, for example, circuitry such as a central processing unit (CPU), a graphics processing unit (GPU), an application-specific integrated circuit (ASIC), or a programmable logic device (e.g., a simple programmable logic device (SPLD), a complex programmable logic device (CPLD), or a field-programmable gate array (FPGA).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A pseudo-data generation apparatus for generating whole observation data which is unavailable and impossible to observe, the pseudo-data generation method comprising:

processing circuitry configured to:

acquire one or more pieces of partial observation data that form part of the whole observation data, the whole observation data being three-dimensional volume magnetic resonance moving image data; and generate pseudo-whole observation data by inputting the one or more pieces of partial observation data to a function, the pseudo-whole observation data being pseudo-data of the whole observation data, wherein the function is optimized by training, without using the unavailable whole observation data, so that partial observation data for training and pseudo-partial observation data for training resemble each other, the pseudo-partial observation data for training being obtained by converting pseudo-whole observation data for training, and wherein the pseudo-whole observation data for training is generated using the function, from the partial observation data for training.

2. The pseudo-data generation apparatus according to claim 1, wherein the function is a generator trained using a conditional generative adversarial network, a decoder trained using a conditional variational auto encoder, or a model trained using a conditional diffusion model.

3. The pseudo-data generation apparatus according to claim 1, wherein the processing circuitry is further configured to:

acquire, as multiple pieces of the partial observation data, a plurality of images captured while shifting a focus, and generate three-dimensional volume data as the pseudo-whole observation data from the multiple pieces of the partial observation data, the three-dimensional volume data including depth information.

4. A pseudo-data generation method for generating whole observation data which is impossible to observe and unavailable, the pseudo-data generation method comprising:

acquiring one or more pieces of partial observation data that form part of whole observation data, the whole observation data being three-dimensional volume magnetic resonance moving image data; and generating pseudo-whole observation data by inputting the one or more pieces of partial observation data to a function, the pseudo-whole observation data being pseudo-data of the whole observation data, wherein the function is optimized by training, without using the unavailable whole observation data, so that partial observation data for training and pseudo-partial observation data for training resemble each other, the pseudo-partial observation data for training being obtained by converting pseudo-whole observation data for training, and wherein the pseudo-whole observation data for training is generated using the function, from the partial observation data for training.

* * * * *